United States Patent [19]
Freyling

[11] 3,747,661
[45] July 24, 1973

[54] TIRE BEAD BREAKER DEVICE
[76] Inventor: George Freyling, Rt. No. 1, Box 284, Altha, Fla. 32421
[22] Filed: Jan. 12, 1972
[21] Appl. No.: 217,092

[52] U.S. Cl. ............................................... 157/1.17
[51] Int. Cl. .......................................... B60c 25/06
[58] Field of Search................. 157/1.1, 1.11, 1.13, 157/1.14, 1.2, 1.24, 1.26, 1.28, 1.3, 1.33

[56] References Cited
UNITED STATES PATENTS
2,655,984  10/1953  Lowrey ............................ 157/1.17
FOREIGN PATENTS OR APPLICATIONS
698,887  10/1953  Great Britain ..................... 157/1.26
623,147  3/1927  France .............................. 157/1.1
84,553  9/1954  Norway ............................. 157/1.17

Primary Examiner—Granville Y. Custer, Jr.
Assistant Examiner—Harold P. Smith, Jr.

[57]  ABSTRACT

A device for aiding in removing a tire from the wheel. This device consists primarily of a frame with a blade for contact with the rim and grooves for fitting various size rims, the device carrying screw shaft means with hook means for engaging the wheel so that a bar maybe rotated upon the screw to apply pressure to the blade of the device for breaking the tire bead away from the rim of the wheel.

4 Claims, 1 Drawing Figure

PATENTED JUL 24 1973
3,747,661
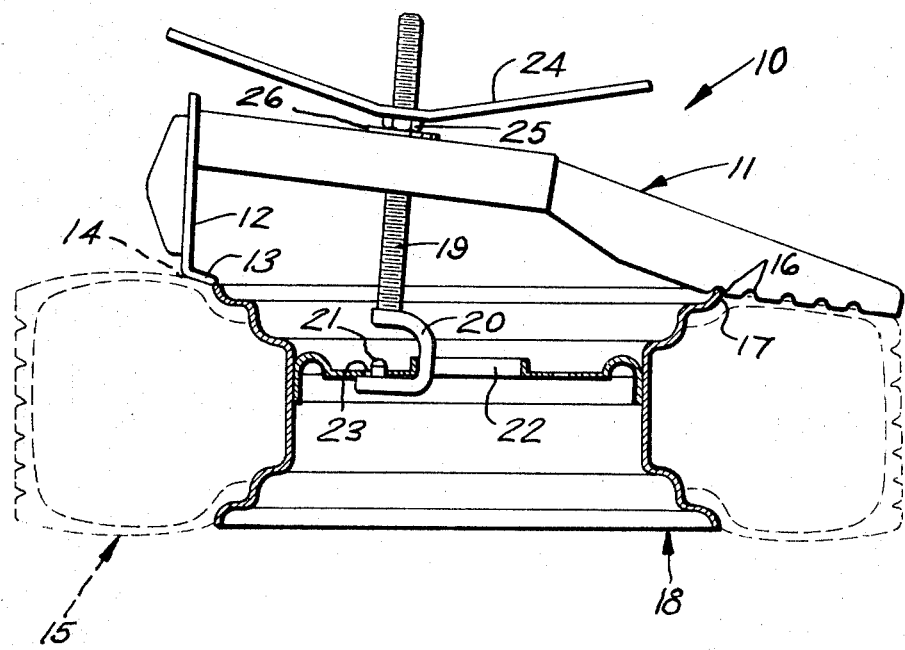

TIRE BEAD BREAKER DEVICE

This invention relates to devices for removing tires from wheels.

It is therefore the primary purpose of this invention to provide a tire bead breaker device which will be of such construction so as to effectively remove the tire bead away from the rim of the wheel.

Another object of this invention is to provide a bead breaker device which will have spaced apart grooves at one end, one of which will engage the rim at the opposite end of the blade, the groove providing a means for the device to be adapted to tires of all sizes.

Another object of this invention is to provide a device of the type described which will have screw shaft means with a U-shaped end and pin means for engaging the wheel so as to render the screw shaft stationary when applying pressure by bar and nut fastener means to break the bead away from the tire.

A further object of this invention is to provide a device of the type described which will have lip means upon the blade for bearing against the bead portion of the tire so as to prevent damage to the tire when pressure is applied in breaking the bead away from the rim of the wheel.

Other objects of the present invention are to provide a tire bead breaker device which is simple in design, inexpensive to manufacture, rugged in construction, easy to use and efficient in operation.

These and other objects will be readily evident upon a study of the following specification and the accompanying drawing wherein:

The drawing is the sole view of the present invention.

According to this invention, a tire bead breaker device 10 is shown to include a Y-shaped body 11 having a blade 12 at one end with a lip 13 for bearing against the bead 14 of the tire 15. The opposite end of body 11 is provided with spaced apart grooves 16 for engagement with the rim 17 of the wheel 18.

It will be noted that the grooves 16 of body 11, provides a means for adapting device 10 to tires of various sizes.

A threaded screw shaft 19 is freely carried within body 11 for a purpose which herein after will be described.

A U-shaped member 20 is fixedly secured to one end of screw shaft 19 and is provided with a projecting pin 21. The U-shaped member 20 of screw shaft 19 is inserted into the central opening 22 of wheel 18 so that pin 21 thereof, will enter one of the openings 23 which normally carry the wheel lugs. When the U-shaped member 20 and the pin 21 engage the openings 23 and 22, the screw shaft 19 is prevented from rotating in order to operate device 10. A wing bar 24 having at its center a nut fastener 25 is threadingly carried upon screw shaft 19 above the body 11 and a nut fastener 25 bears against a washer 26.

In use, the bar 24 when rotated by the operator will apply pressure through the lip 13 of blade 12, to the bead 14 of tire 15 and thus will break it away from the wheel 18.

It will be noted that the screw shaft 19 and the bar 24 maybe removed or re-inserted without complete removal, one from the other, thus enabling the body 11 of device 10 to be placed independently.

What I now claim is:

1. A device for aiding and removing a tire from a wheel, comprising, a main body portion with rim engaging grooves, a blade portion carried by said body portion for applying pressure against the bead, a screw shaft and U-shaped member carried by said body of said device with a wing bar and nut fastener for applying the necessary pressure to break the head away from the tire.

2. The combination according to claim 1, wherein said grooves are spaced apart on one end of said body of said device that serve to engage the rim so as to prevent the blade member of said body from losing full contact with the tire bead and said blade member is provided with an angled lip portion, said lip portions serving as bearing means against the bead of said tire for effectively applying pressure with said device to break said bead away without damaging said tire.

3. The combination according to claim 2, wherein said body of said device includes said screw shaft member, said screw shaft member being freely carried within said body and one end of said screw shaft includes a fixedly secured U-shaped member, said U-shaped member having a projecting pin for being received within one of the plurality of wheel openings that receive the whell lugs and said U-shaped member is insertable into the central opening of said wheel and the engagement of said pin thus prevent said screw shaft from rotating when said wing bar is rotated to apply pressure to said blade for breaking away said bead away from said rim of said wheel.

4. The combination according to claim 3, wherein said wing bar includes a fixed nut fastener thereto which is settingly carried upon said screw shaft and said nut fastener portion bears against a washer member on the upper side of said body and when said bar is rotated by the operator in a clockwise fashion, pressure is applied to said lip of said blade of said device so as to forceably break said bead away from said rim of said wheel said tires carried upon.

* * * * *